United States Patent
Tiwari

(10) Patent No.: US 9,936,475 B2
(45) Date of Patent: Apr. 3, 2018

(54) DEVICE AND METHOD OF HANDLING DETACH PROCEDURE

(71) Applicant: HTC Corporation, Taoyuan (TW)

(72) Inventor: Kundan Tiwari, Taoyuan (TW)

(73) Assignee: HTC Corporation, Taoyuan (TW)

(*) Notice: Subject to any disclaimer, the term of this patent is extended or adjusted under 35 U.S.C. 154(b) by 0 days.

(21) Appl. No.: 15/088,078

(22) Filed: Mar. 31, 2016

(65) Prior Publication Data

US 2016/0295545 A1    Oct. 6, 2016

Related U.S. Application Data

(60) Provisional application No. 62/142,147, filed on Apr. 2, 2015.

(51) Int. Cl.
| | | |
|---|---|---|
| *H04W 4/00* | (2009.01) | |
| *H04W 60/06* | (2009.01) | |
| *H04W 60/00* | (2009.01) | |
| *H04W 76/02* | (2009.01) | |

(52) U.S. Cl.
CPC ......... *H04W 60/06* (2013.01); *H04W 60/005* (2013.01); *H04W 76/027* (2013.01); *H04W 4/00* (2013.01)

(58) Field of Classification Search
CPC . H04W 60/06; H04W 60/005; H04W 76/027; H04W 4/00
USPC ...................................................... 455/435.1
See application file for complete search history.

(56) References Cited

U.S. PATENT DOCUMENTS

| | | | | |
|---|---|---|---|---|
| 6,463,055 | B1* | 10/2002 | Lupien .................. | H04W 88/16 370/353 |
| 9,723,528 | B2* | 8/2017 | Ling ..................... | H04W 36/14 |
| 2005/0276244 | A1* | 12/2005 | Gronberg .............. | H04W 88/06 370/328 |
| 2007/0165600 | A1* | 7/2007 | Fauconnier ........... | H04W 88/06 370/352 |
| 2009/0258671 | A1* | 10/2009 | Kekki ................. | H04W 76/027 455/552.1 |

(Continued)

FOREIGN PATENT DOCUMENTS

CN            103155639 A      6/2013

OTHER PUBLICATIONS

Search Report dated Aug. 17, 2016 for EP application No. 161634779, pp. 1-14.

(Continued)

*Primary Examiner* — Mong-Thuy Tran
(74) *Attorney, Agent, or Firm* — Winston Hsu

(57) ABSTRACT

A communication device of handling a detach procedure comprises a storage unit for storing instructions and a processing means coupled to the storage unit. The processing means is configured to execute the instructions stored in the storage unit. The instructions comprise attaching to a network in a Network Mode of Operation I (NMO I) for a circuit switched (CS) domain and a packet switched (PS) domain; transmitting a first General Packet Radio Service (GPRS) mobility management (GMM) message to the network; receiving a second GMM message comprising a GMM cause indicating an implicit detach from the network; and performing an International Mobile Subscriber Identity (IMSI) detach for the PS domain but not for the CS domain, when a Radio Resource (RR) connection exists.

8 Claims, 3 Drawing Sheets

(56) References Cited

U.S. PATENT DOCUMENTS

| | | | | |
|---|---|---|---|---|
| 2010/0098023 | A1* | 4/2010 | Aghili | H04W 36/0022 370/331 |
| 2010/0297979 | A1* | 11/2010 | Watfa | H04W 8/205 455/404.1 |
| 2011/0207465 | A1* | 8/2011 | Dwyer | H04W 76/046 455/450 |
| 2011/0237281 | A1* | 9/2011 | Busropan | G01D 4/002 455/507 |
| 2011/0294458 | A1* | 12/2011 | Tiwari | H04W 76/064 455/404.1 |
| 2012/0076121 | A1 | 3/2012 | Choi | |
| 2012/0182912 | A1* | 7/2012 | Watfa | H04W 36/0022 370/311 |
| 2013/0016608 | A1 | 1/2013 | Tiwari | |
| 2013/0044709 | A1* | 2/2013 | Adjakple | H04W 76/025 370/329 |
| 2013/0107863 | A1* | 5/2013 | Faccin | H04W 36/0022 370/331 |
| 2013/0188601 | A1 | 7/2013 | Sun | |
| 2013/0196656 | A1* | 8/2013 | Liu | H04W 8/06 455/433 |
| 2014/0126361 | A1* | 5/2014 | Tiwari | H04W 76/022 370/230 |
| 2015/0029978 | A1* | 1/2015 | Tranberg | H04W 60/04 370/329 |
| 2015/0092665 | A1* | 4/2015 | Choi | H04W 76/062 370/328 |

OTHER PUBLICATIONS

HTC, Qualcomm Incorporated, "Clarification to the combined TAU procedure when rejected with EMM cause #10", 3GPP TSG-CT WG1 Meeting #84bis, C1-134303, rev. of C1-134022, Oct. 7-11, 2013, Porto (Portugal), XP050729716.

3GPP TS 24.008 V13.1.0 (Mar. 2015), "3rd Generation Partnership Project; Technical Specification Group Core Network and Terminals; Mobile radio interface Layer 3 specification; Core network protocols; Stage 3 (Release 13)", XP050927775, pp. 1-714

3GPP TS 24.301 V13.1.0 (Mar. 2015), "3rd Generation Partnership Project; Technical Specification Group Core Network and Terminals; Non-Access-Stratum (NAS) protocol for Evolved Packet System (EPS); Stage 3 (Release 13)", XP050927892, pp. 1-383

HTC, "Handling of GMM cause code #10(implicitly detached)", 3GPP TSG-CT WG1 Meeting #91, C1-151468, rev. of C1-151215, Apr. 13-17, 2015, Bratislava (Slovakia), XP050947067

3GPP TS 24.301 V13.1.0 (Mar. 2015) Technical Specification 3rd Generation Partnership Project; Technical Specification Group Core Network and Terminals; Non-Access-Stratum (NAS) protocol for Evolved Packet System (EPS); Stage 3 (Release 13)

3GPP TS 24.008 V13.1.0 (Mar. 2015), 3rd Generation Partnership Project; Technical Specification Group Core Network and Terminals; Mobile radio interface Layer 3 specification; Core network protocols; Stage 3 (Release 13), pp. 1-714

Office action dated Jun. 20, 2017 for EP application No. 161634779, pp. 1-6

Office action dated Jul. 17, 2017 for the Taiwan application No. 105110567, filing date Apr. 1, 2016, pp. 1-6.

* cited by examiner

DEVICE AND METHOD OF HANDLING DETACH PROCEDURE

CROSS REFERENCE TO RELATED APPLICATIONS

This application claims the benefit of U.S. Provisional Application No. 62/142,147, filed on Apr. 2, 2015, which is incorporated herein by reference.

BACKGROUND OF THE INVENTION

1. Field of the Invention

The present invention relates to a communication device and a method used in a wireless communication system, and more particularly, to a communication device and a method of handling a detach procedure initiated by a network in a wireless communication system.

2. Description of the Prior Art

A long-term evolution (LTE) system supporting the 3rd Generation Partnership Project (3GPP) Rel-8 standard and/or the 3GPP Rel-9 standard are developed by the 3GPP as a successor of the universal mobile telecommunication system (UMTS) for further enhancing performance of the UMTS to satisfy increasing needs of users. The LTE system includes a new radio interface and a new radio network architecture that provides high data rate, low latency, packet optimization, and improved system capacity and coverage. In the LTE system, a radio access network known as an evolved universal terrestrial radio access network (E-UTRAN) includes at least one evolved Node-B (eNB) for communicating with at least one user equipment (UE), and for communicating with a core network including a mobility management entity (MME), a serving gateway, etc., for Non-Access Stratum (NAS) control.

A LTE-advanced (LTE-A) system, as its name implies, is an evolution of the LTE system. The LTE-A system targets faster switching between power states, improves performance at the coverage edge of an eNB, increases peak data rate and throughput, and includes advanced techniques, such as carrier aggregation (CA), coordinated multipoint (CoMP) transmissions/reception, uplink (UL) multiple-input multiple-output (UL-MIMO), licensed-assisted access (LAA) using LTE, etc. For a UE and an eNB to communicate with each other in the LTE-A system, the UE and the eNB must support standards developed for the LTE-A system, such as the 3GPP Rel-10 standard or later versions.

According to the 3GPP standard, the UE may detach all services, if the UE is notified that the UE is implicitly detached, e.g., during a detach procedure. The services currently being received are not considered when detaching the services. The services are dropped, and inconvenience is caused to the UE. Thus, how to handling the detach notification transmitted by the network is an important problem to be solved.

SUMMARY OF THE INVENTION

The present invention therefore provides devices for handling a detach procedure to solve the abovementioned problem.

A communication device of handling a detach procedure comprises a storage unit for storing instructions and a processing means coupled to the storage unit. The processing means is configured to execute the instructions stored in the storage unit. The instructions comprise attaching to a network in a Network Mode of Operation I (NMO I) for a circuit switched (CS) domain and a packet switched (PS) domain; transmitting a first General Packet Radio Service (GPRS) mobility management (GMM) message to the network; receiving a second GMM message comprising a GMM cause indicating an implicit detach from the network; and performing an International Mobile Subscriber Identity (IMSI) detach for the PS domain but not for the CS domain, when a Radio Resource (RR) connection exists.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
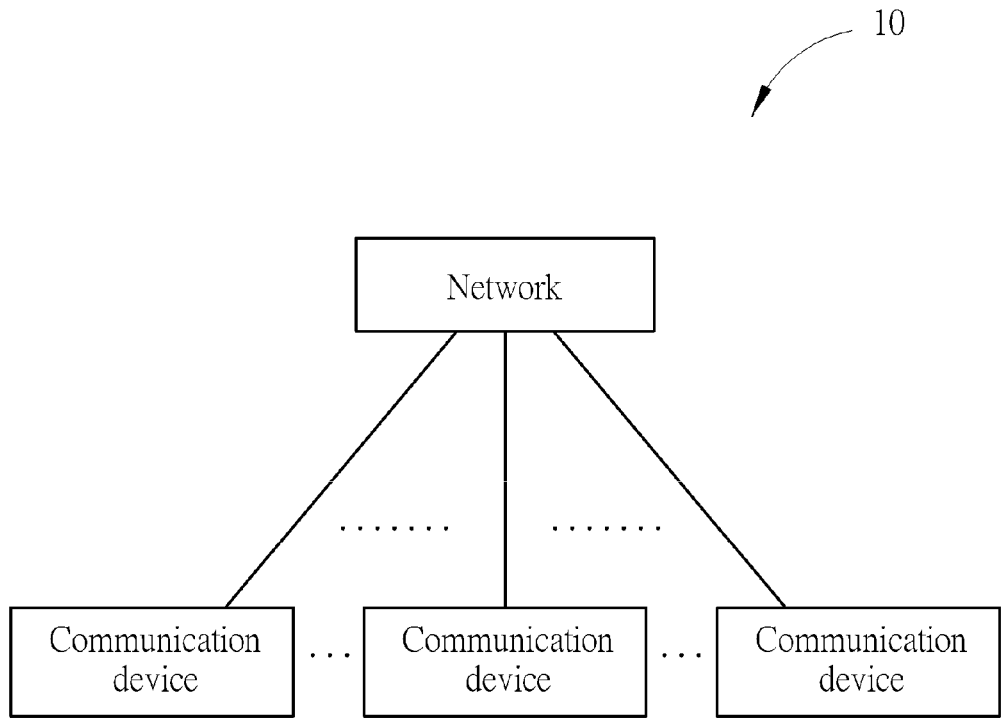
FIG. 1 is a schematic diagram of a wireless communication system according to an example of the present invention.

Please refer to FIG. 1, which is a schematic diagram of a wireless communication system 10 according to an example of the present invention. The wireless communication system 10 is briefly composed of a network and a plurality of communication devices. In FIG. 1, the network and the communication devices are simply utilized for illustrating the structure of the wireless communication system 10. Practically, the network may be a Global System for Mobile Communications (GSM) system or a General Packet Radio Service (GPRS) system including at least one base station (BS). The network may be a universal mobile telecommunication system (UMTS) including at least one Node B (NB).

A communication device may be a mobile station (MS), a user equipment (UE), a low cost device (e.g., machine type communication (MTC) device), a device-to-device (D2D) device, a mobile phone, a laptop, a tablet computer, an electronic book, a portable computer system, a vehicle, airplane or combination thereof. In addition, the network and the communication device can be seen as a transmitter or a receiver according to direction (i.e., transmission direction), e.g., for an uplink (UL), the communication device is the transmitter and the network is the receiver, and for a downlink (DL), the network is the transmitter and the communication device is the receiver.

Figure 2:
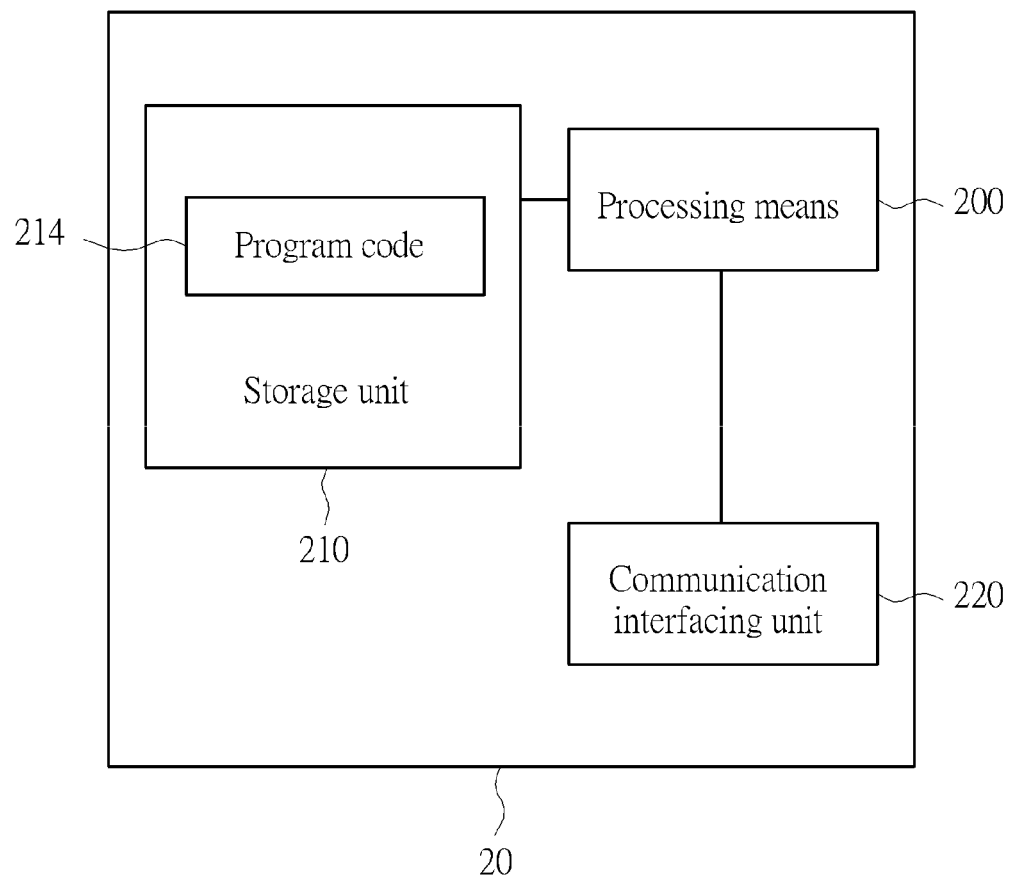
FIG. 2 is a schematic diagram of a communication device according to an example of the present invention.

FIG. 2 is a schematic diagram of a communication device 20 according to an example of the present invention. The communication device 20 may be a communication device or the network shown in FIG. 1, but is not limited herein. The communication device 20 may include a processing means 200 such as a microprocessor or Application Specific Integrated Circuit (ASIC), a storage unit 210 and a communication interfacing unit 220. The storage unit 210 may be any data storage device that may store a program code 214, accessed and executed by the processing means 200. Examples of the storage unit 210 include but are not limited to a subscriber identity module (SIM), read-only memory (ROM), flash memory, random-access memory (RAM), Compact Disc Read-Only Memory (CD-ROM), digital versatile disc-ROM (DVD-ROM), Blu-ray Disc-ROM (BD-ROM), magnetic tape, hard disk, optical data storage device, non-volatile storage unit, non-transitory computer-readable medium (e.g., tangible media), etc. The communication interfacing unit 220 is preferably a transceiver and is used to transmit and receive signals (e.g., data, messages and/or packets) according to processing results of the processing means 200.

Figure 3:
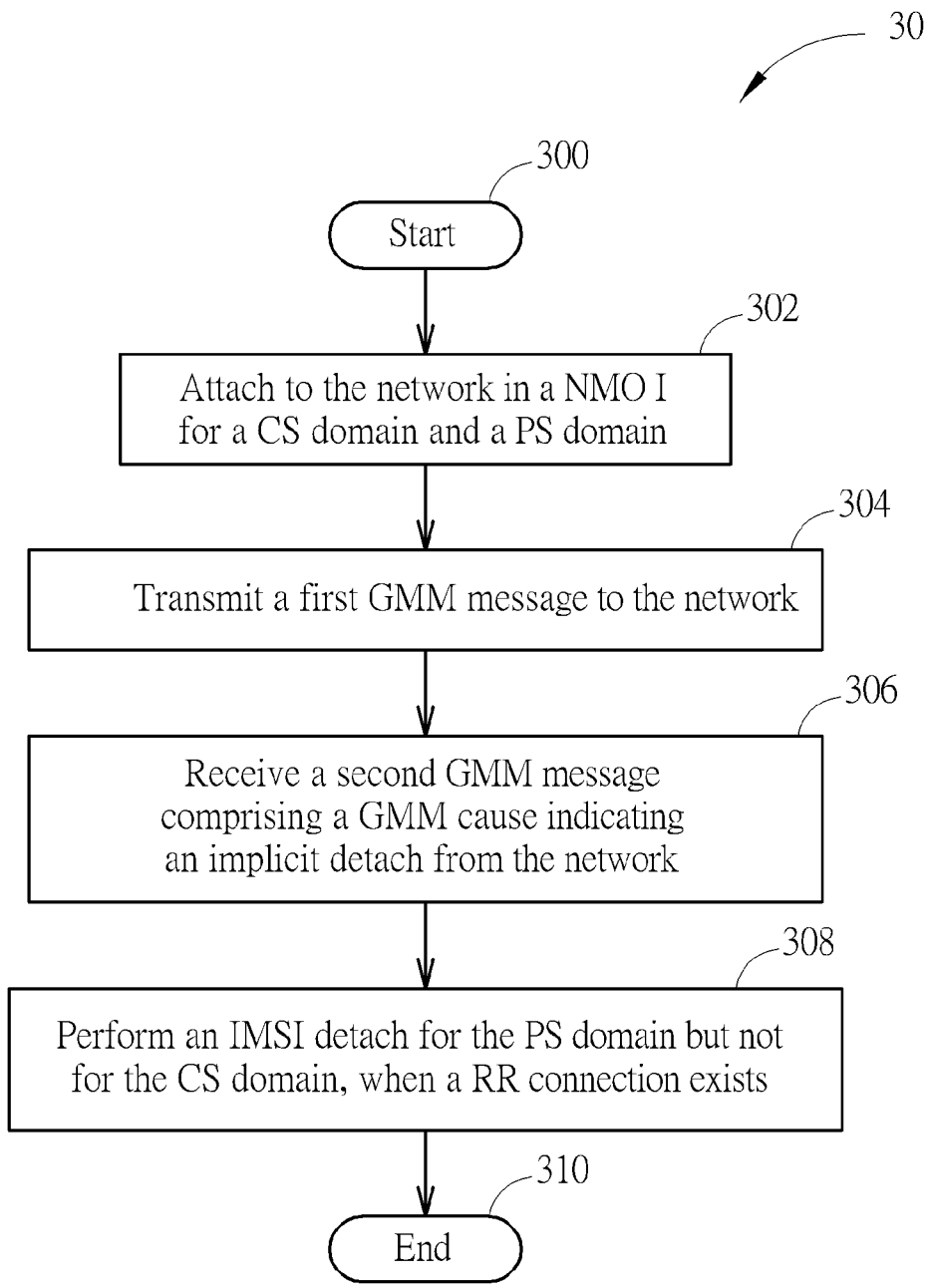
FIG. 3 is a flowchart of a process according to an example of the present invention.

FIG. 3 is a flowchart of a process 30 according to an example of the present invention. The process 30 may be utilized in a communication device of FIG. 1, to handle a detach procedure. The process 30 may be compiled into the program code 214 and includes the following steps:

Step 300: Start.

Step 302: Attach to the network in a Network Mode of Operation I (NMO I) for a circuit switched (CS) domain and a packet switched (PS) domain.

Step 304: Transmit a first GPRS mobility management (GMM) message to the network.

Step 306: Receive a second GMM message comprising a GMM cause indicating an implicit detach from the network.

Step 308: Perform an International Mobile Subscriber Identity (IMSI) detach for the PS domain but not for the CS domain, when a radio resource (RR) connection exists.

Step 310: End.

According to the process 30, the communication device may to the network in a NMO I for a CS domain and a PS domain. The communication device may transmit a first GMM message to the network. Accordingly, the communication device may receive a second GMM message comprising a GMM cause indicating an implicit detach from the network. Then, the communication device may perform an International Mobile Subscriber Identity (IMSI) detach for the PS domain but not for the CS domain, when a radio resource (RR) connection exists. That is, the communication device takes the RR connection into consideration, when the communication device prepares to perform the IMSI detach according to the second GMM message. Note that the communication device may be a class A MS or a class B MS, and is not limited herein. Thus, service(s) in the CS domain is not dropped, and convenience of the communication device is improved.

An example is illustrated according to the process 30 as follows. the communication device may attach to the network in a NMO I for a CS domain and a PS domain. The communication device may initiate one of a combined routing area update procedure, a periodic updating procedure and a service request procedure. The communication device may transmit a routing area update request message or a service request message indicating the one of the combined routing area update procedure, the periodic updating procedure and the service request procedure to the network. Accordingly, the communication device may receive a response message in response to the routing area update request message or the service request message from the network, wherein the response message indicates that the communication device is implicitly detached from the network. Then, the communication device may perform an IMSI detach for the PS domain only when the UE has a RR connection (i.e., not detaching the CS domain when the UE has a RR connection) according to the response message and at least one of a RR connection and a RR connection establishment.

Realization of the process 30 is not limited to the above description.

In one example, the communication device may attach to the network in the NMO I by transmitting an attach request message with an attach type "combined GPRS/IMSI attach". In one example, the first GMM message may be a routing area update request message or a service request message, and the second GMM message may be a routing area update reject message or a service reject message. In one example, the communication device may perform the IMSI detach for only the PS domain according to the second GMM message, if the UE has the RR connection. That is, the communication device keeps attaching to the CS domain, if the UE has the RR connection exists. In one example, the communication device may perform the above IMSI detach by keeping the RR connection, and transmitting an attach request message indicating an attach for the PS domain to the network, after receiving the second GMM message.

In one example, the communication device may perform the IMSI detach for both the CS domain and the PS domain according to the second GMM message, if the UE does not has the RR connection. Further, the communication device may perform the above IMSI detach by transmitting an attach request message indicating an attach for both the CS domain and the PS domain to the network, after receiving the second GMM message.

In above examples, the CS domain may include one or more CS services performed by the communication device, and the PS domain may include one or more PS services performed by the communication device. Further, a PS service may include a GPRS service. In one example, the response message may include a GMM cause value 10. That is, the above examples (e.g., step 308) may be performed after receiving the GMM cause value 10. A situation where the communication receives the second GMM message is not limited. In example, the communication device may receive the second GMM message during a periodic/combined routing area updating procedure. In another example, the communication device may receive the second GMM message during a service request procedure.

A periodic routing area updating procedure may be triggered, when a periodic update timer T3312 expires and the UE sends a ROUTING AREA UPDATE REQ message with an update type "periodic update". The combined routing area update procedure may be initiated, when the UE attached for both PS and CS domain changes Routing Area (RA) or other procedure as listed in section of 4.7.5.2.1 of 3GPP TS 24.008. The combined routing area updating procedure may be initiated by sending a routing area update request message with an update type "combined RA/LA updating".

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20.

Examples of the hardware may include analog circuit(s), digital circuit(s) and/or mixed circuit(s). For example, the hardware may include ASIC(s), field programmable gate array(s) (FPGA(s)), programmable logic device(s), coupled hardware components or combination thereof. In another example, the hardware may include general-purpose processor(s), microprocessor(s), controller(s), digital signal processor(s) (DSP(s)) or combination thereof.

Examples of the software may include set(s) of codes, set(s) of instructions and/or set(s) of functions retained (e.g., stored) in a storage unit, e.g., a computer-readable medium. The computer-readable medium may include SIM, ROM, flash memory, RAM, CD-ROM/DVD-ROM/BD-ROM, magnetic tape, hard disk, optical data storage device, non-volatile storage unit, or combination thereof. The computer-readable medium (e.g., storage unit) may be coupled to at least one processor internally (e.g., integrated) or externally (e.g., separated). The at least one processor which may include one or more modules may (e.g., be configured to) execute the software in the computer-readable medium. The set(s) of codes, the set(s) of instructions and/or the set(s) of functions may cause the at least one processor, the module(s), the hardware and/or the electronic system to perform the related steps.

Examples of the electronic system may include a system on chip (SoC), system in package (SiP), a computer on module (CoM), a computer program product, an apparatus, a mobile phone, a laptop, a tablet computer, an electronic book or a portable computer system, and the communication device 20.

To sum up, the present invention provides device and a method for handling a routing area updating procedure or a service request procedure when the network indicates that the communication device is implicitly detached. The communication device takes a RR connection and/or a RR connection establishment into consideration, when the communication device prepares to perform the IMSI detach according to a message transmitted by a network. Thus, service(s) in a CS domain is not dropped, and convenience of the communication device is improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device of handling a detach procedure, comprising:
 a storage unit, for storing instructions of:
  attaching to a network in a Network Mode of Operation I (NMO I) for a Circuit Switched (CS) domain and a Packet Switched (PS) domain;
  transmitting a first General Packet Radio Service (GPRS) mobility management (GMM) message to the network;
  receiving a second GMM message comprising a GMM cause value 10 indicating an implicit detach from the network;
  performing an International Mobile Subscriber Identity (IMSI) detach for the PS domain but not for the CS domain, if a Radio Resource (RR) connection exists; and
  performing the IMSI detach for both the CS domain and the PS domain according to the second GMM message, if the RR connection does not exist and
 a processing means, coupled to the storage unit, configured to execute the instructions stored in the storage unit.

2. The communication device of claim 1, wherein the instruction of attaching to the network in the NMO I comprises:
 transmitting an attach request message with an attach type "combined GPRS/IMSI attach".

3. The communication device of claim 1, wherein the first GMM message is a routing area update request message or a service request message, and the second GMM message is a routing area update reject message or a service reject message.

4. The communication device of claim 1, wherein the communication device performs the IMSI detach for only the PS domain by performing following instructions:
 keeping the RR connection; and
 transmitting an attach request message indicating an attach for the PS domain to the network, after receiving the response message.

5. The communication device of claim 1, wherein the CS domain comprises a CS service performed by the communication device, and the PS domain comprises a PS service performed by the communication device.

6. The communication device of claim 5, wherein the PS service comprises a GPRS service.

7. The communication device of claim 1, wherein the communication device receives the second GMM message during a periodic/combined routing area updating procedure or a service request procedure.

8. The communication device of claim 1, wherein the communication device is a class A mobile station (MS) or a class B MS.

* * * * *